No. 820,813. PATENTED MAY 15, 1906.
S. T. MUFFLY.
PROCESS OF CONDENSING OR DISSOLVING GASES AND VAPORS.
APPLICATION FILED OCT. 6, 1905.

2 SHEETS—SHEET 1.

Witnesses:
Walker F. Pallinger
Titus H. Crown

Inventor:
Sidney T. Muffly.
by his Attorneys,
Howson & Howson

No. 820,813. PATENTED MAY 15, 1906.
S. T. MUFFLY.
PROCESS OF CONDENSING OR DISSOLVING GASES AND VAPORS.
APPLICATION FILED OCT. 6, 1905.

2 SHEETS—SHEET 2.

Witnesses:
Walter F. Pullinger
Titus Helvour

Inventor:
Sidney T. Muffly
by his Attorneys,
Howson & Howson

UNITED STATES PATENT OFFICE.

SIDNEY T. MUFFLY, OF PHILADELPHIA, PENNSYLVANIA, ASSIGNOR TO PHILADELPHIA CYANIDE PROCESS COMPANY, OF WILMINGTON, DELAWARE, AND PHILADELPHIA, PENNSYLVANIA, A CORPORATION OF DELAWARE.

PROCESS OF CONDENSING OR DISSOLVING GASES AND VAPORS.

No. 820,813.  Specification of Letters Patent.  Patented May 15, 1906.

Application filed October 6, 1905. Serial No. 281,674.

*To all whom it may concern:*

Be it known that I, SIDNEY T. MUFFLY, a citizen of the United States, residing in Philadelphia, Pennsylvania, have invented a Process of Condensing or Dissolving Gases and Vapors, of which the following is a specification.

One object of my invention is to provide an efficient, rapid, and relatively inexpensive process for dissolving gases or solid particles carried by gases in suitable solutions, it being more particularly desired to provide a process of the character above noted for recovering the hydrocyanic-acid gas given off during the operation of the cyanid process for extracting precious metals from their ores, and particularly in that specific process described and claimed by me in an application for United States Patent, dated August 14, 1905, Serial No. 274,119.

I further desire that the process shall be of such a nature that in addition to the above characteristics it shall be possible to recover by its use the precious metals driven off as dust or volatilized during the roasting of complex ores or in connection with various smelting or refining processes, it being further desired to dissolve and precipitate base metals or their gaseous compounds as well as other gases generated during the operation of the cyanid process, so as to permit of their recovery as by-products.

These objects I attain as hereinafter set forth, reference being had to the accompanying drawings, in which—

Figure 1:
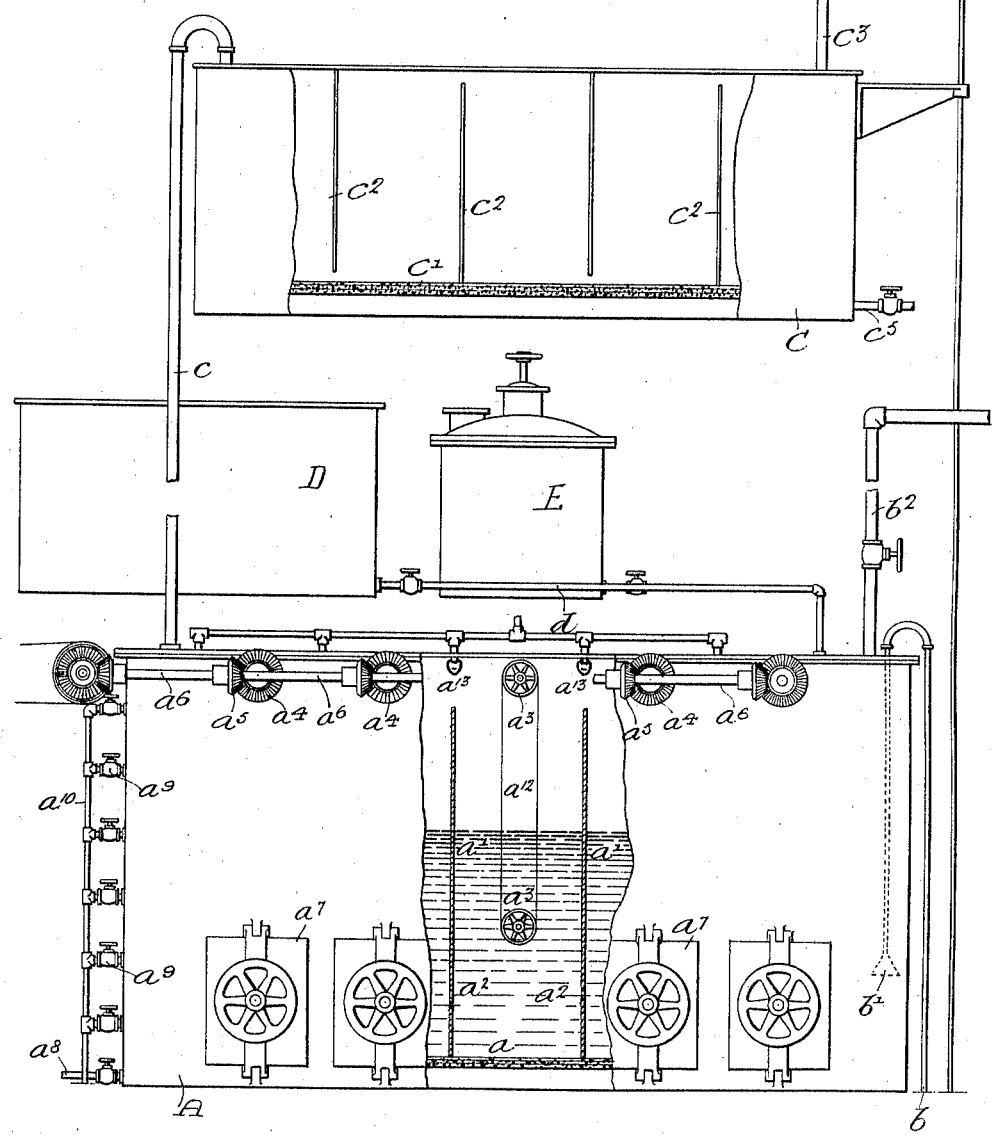
Figure 2:
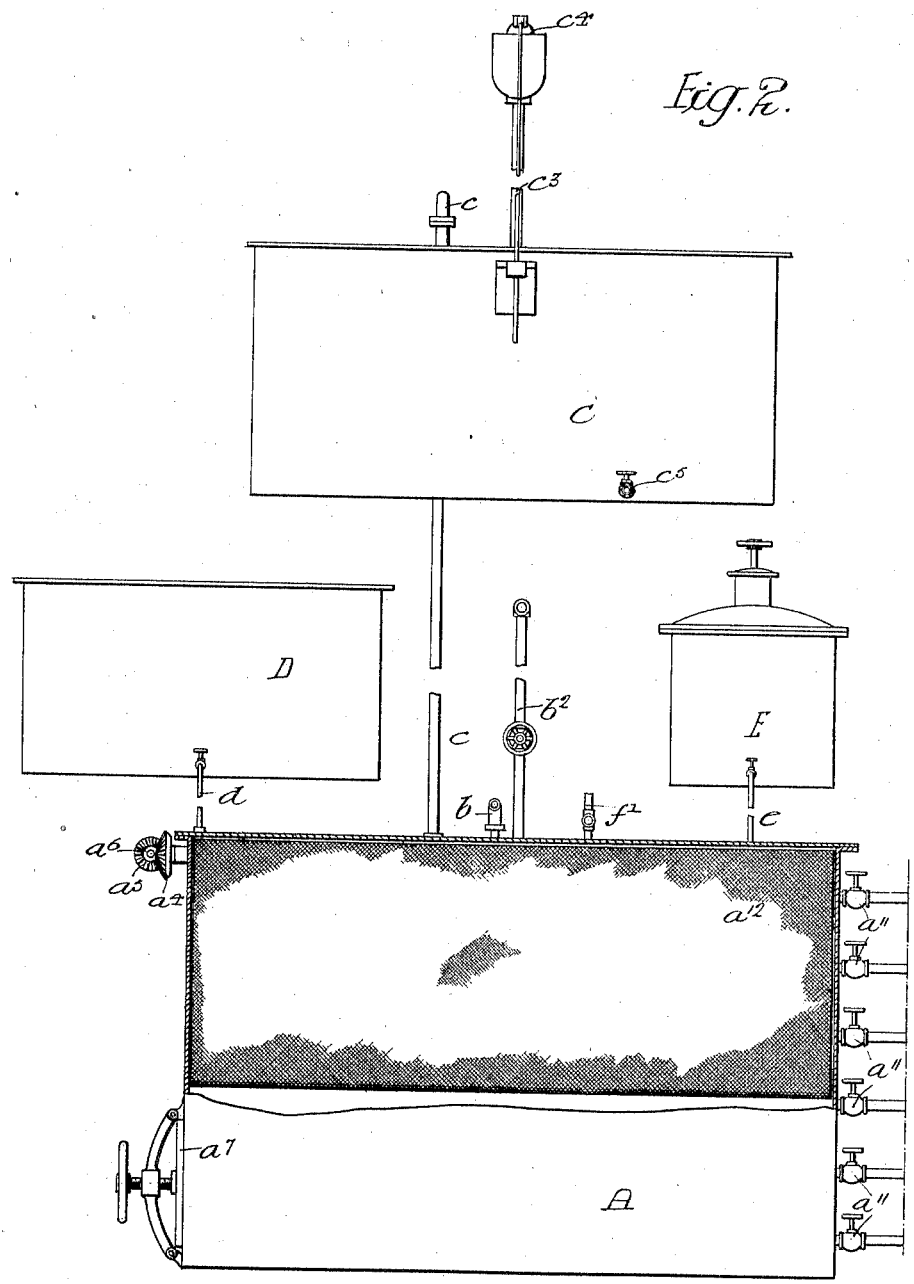

Figure 1 is an elevation, to some extent diagrammatic, of a combination of apparatus in which my process may be carried out, certain detail portions of said apparatus being shown in section; and Fig. 2 is an end elevation of the apparatus shown in Fig. 1, also illustrating in section further details of construction.

In carrying out my process I cause bodies of gas and vapor carrying relatively small amounts of precious and base metals either as compounds or as almost infinitely small solid particles to be forced through a solution of a double cyanid—as, for example, potassium and bromid cyanid—which solution is exposed to the above-mentioned gases, &c., in the form of thin films. In order to avoid unnecessary repetition, I wish it understood that while I may hereinafter in the specification and claims refer to the treatment of gases by my improved process I desire said process to include the treatment of precious and base metals, whether in a volatilized state or as fine dust, as well as in the form of vapor carrying metallic compounds.

For precipitating the base metals common in cyanid solutions used in my above-noted method of extracting precious metals from their ores I treat such solutions with ammonium hydrate, and also preferably carry on the process within an inclosed casing to which is constantly delivered a supply of air under a pressure of from five to forty pounds above the atmosphere and at a suitable temperature, the supply of air being so arranged that it will exert a direct downward pressure upon the body of liquid within the casing, as well as exert direct pressure upon the films of the solution in which the gases are dissolved. I have found that by thus conducting the process at an air-pressure above atmospheric the chemical reactions occurring are materially hastened and otherwise aided, with the result that the time as well as the cost of operation are materially lessened.

Referring to the above drawings, A represents a chamber or a casing of suitable form having within it at some distance above its bottom a false floor or horizontal partition $a$ of filtering material, above which are a series of vertically-extending partitions $a'$, usually of wood, which are run to within a short distance of the top of the casing.

Slightly above the filter-bottom $a$ there are in the partitions a number of openings $a^2$ to permit of the free passage of liquid from one end of the casing to the other. Intermediate of each pair of partitions and, like them, extending the full width of the chamber A are a pair of rollers $a^3$, between which extends an endless apron of burlap or other relatively porous fabric, the rollers being so arranged that while one of them is adjacent to the top of the casing the other is supported in suitable bearings at some point below the predetermined level of the liquid in the casing.

The upper roller of each pair has fixed to its spindle a bevel-gear $a^4$, and these beveled gears mesh with other gears $a^5$, carried upon a suitable shaft $a^6$, outside of the casing, which is designed to be driven from a source of power in any desired manner so as to continually turn the rollers $a^3$ and consequently move the aprons. The chamber A is provided with openings in one of its sides respectively entering the spaces between each pair of partitions $a'$, these openings being closed by cover-plates $a^7$, held in position in any desired manner.

Gases, &c., may be delivered to the casing either through a pipe $b$, having a funnel-shaped end $b'$ opening below the level of the surface of the liquid in the chamber, or from a pipe $b^2$ in the top of said chamber. At the opposite end of the chamber from that at which said said pipes $b$ and $b^2$ enter there is an outlet-pipe $c$, connected to an inclosed box C, having a false bottom $c'$, of filtering material, above which are a series of baffles $c^2$, designed to provide a tortuous passage from the point of entrance of the pipe $c$ to an outlet $c^3$ at the opposite end of the box, which outlet is provided with a suitably-actuated valve $c^4$, whereby the air or gas under pressure within the box C is periodically allowed to escape.

A container D is provided for the solvent solution to be used in the apparatus, and this is connected by means of a pipe $d$ to that end of the chamber A adjacent to the gas-inlet pipes $b$ and $b^2$. There is also provided a container E for the ammonium or other alkaline hydrate to be used.

A suitable drain-pipe $a^8$ is provided for the space containing filtered liquid within the tank A, which is also provided with a single outlet-pipe $a^{10}$, whereby through valved connections $a^9$ the level of the liquid may be regulated. There is also, as shown in Fig. 2, a series of valved outlets $a^{11}$, whereby liquid and slime precipitates may be drawn off from the chamber at any desired level for the purpose of testing.

While in the operation of the process described and claimed in my above-mentioned application the air carrying the hydrocyanic-acid gas is preferably under pressure, it may be desirable to provide an additional supply of air, and for this purpose I provide at the top of the chamber A a series of pipes $a^{13}$, extending across the same, having in their lower faces slotted openings and also provided with means whereby the air under pressure is delivered at a uniform rate to all points of the chamber.

Under operating conditions the shaft $a^6$ causes the aprons $a^{12}$ to continually enter and emerge from the solution within the chamber A, so that those portions of said aprons outside of the liquid carry a thin film of the solution. Said solution, which is preferably a double cyanid of potassium and bromin, is supplied from the tank B, while the ammonium hydrate or other desired alkaline hydrate is supplied from the tanks D and E, respectively, the strength of the cyanid solution usually ranging from .1 to .5 of one per cent. The double cyanid itself is compounded in the proportion of five parts of potassium cyanid to one part of bromin cyanid. If now gas, vapors, or dust, as above noted, be passed into the chamber A through pipe $b$, it will be first passed into the body of the liquid in the chamber A and then forced to pass through the thin films of liquid carried by the fabric aprons $a^{12}$, as well as passed over the surface of said liquid. Such treatment very effectively and quickly causes the hydrocyanic-acid gas, as well as the metallic particles or compounds, to be dissolved in the cyanid solution, while the base-metal compounds, formed at the same time, are at once precipitated as hydrates by the action of the alkaline hydrate delivered from the container E.

I have found that the reactions taking place are favored and hastened by the direct downward action of the air under pressure upon the surface of the body of liquid, as well as on the films of the same, and it will be seen that from time to time said air passes out from the chamber A through the pipe $c$ into the box C, thereby being passed in contact with the baffle-plates $c^2$ and caused to deposit any liquid carried by it in the form of vapor. It is finally permitted to periodically escape through the pipe $c^3$ and valve $c^4$. The liquid so deposited in the box C passes through the filter-partition $c'$ and may be drawn off through the outlet-pipe $c^5$.

In the operation of the process of extracting precious metals from their ores described and claimed in my application above referred to the double-cyanid solution after having been permitted to dissolve a certain amount of hydrocyanid-acid gas, &c., is delivered to the stamp-mortars and to the lixiviators for use in dissolving additional amounts of precious metals, so that it will be seen that the hydrocyanic-acid gas, which is always given off in the carrying out of the cyanid process, is saved and repeatedly reused.

As solid material collects within the chamber A the liquid may be drawn off from time to time and the covers $a^7$ removed to permit of the collection and removal of the precipitates or slimes, which may be treated in any desired manner to recover their valuable constituents.

If the solution within the chamber A be not used for the further treatment of bodies of ore, it may upon removal be treated electrolytically for the recovery of the precious metals in solution.

Having thus described my invention, I claim and desire to secure by Letters Patent—

1. The process of recovering gases or material carried thereby in finely-divided or volatile form, which consists in passing the same through a thin film or films of a solvent solution carried upon a suitable supporting medium, and then removing the saturated solution and solid material on said medium by immersing the latter in a body of the solution, substantially as described.

2. The process of recovering gases or material carried thereby in finely-divided or volatilized form, which consists in dissolving the same in a cyanid solution by passing them through a thin film or films of the solution, thereby obtaining them in form for further use or recovery, substantially as described.

3. The process of recovering gases or material carried thereby in finely-divided or volatilized form, which consists in dissolving the same in a double cyanid of potassium and bromin by passing them through a thin film or films of the same, thereby obtaining them in form for further use or recovery, substantially as described.

4. The process of recovering gases or material carried thereby in finely-divided or volatilized form, which consists in dissolving the same in a cyanid solution by passing them through constantly-renewed films thereof, whereby said substances are obtained in a form for further use or recovery, substantially as described.

5. The process of recovering gases or material carried thereby in finely-divided or volatilized form, which consists in dissolving the same in a solution of double cyanid of potassium and bromin, whereby said substances are obtained in form for further use or recovery, substantially as described.

6. The process of recovering gases or material carried thereby in finely-divided or volatilized form which consists in passing the same into a solvent solution, precipitating the base metallic compounds formed, and then passing said gases, &c., through a series of thin films of said solution, substantially as described.

7. The process of recovering gases and base or other metals carried thereby in finely-divided or volatilized form, which consists in dissolving the same in a solution of a double cyanid of potassium and bromin by passing them through a series of thin films of such solution, and precipitating by means of an alkaline hydrate the base metallic compounds formed in said solution, said substances being thereby secured in form for further use or recovery, substantially as described.

8. The process of recovering gases or material carried thereby in a finely-divided or volatilized form which consists in passing the same through a solvent solution exposed to air acting upon its surface and under a pressure greater than that of the atmosphere, said substances being capable of reacting with the oxygen of the atmosphere in the presence of said solution, substantially as described.

9. The process of recovering gases or material carried thereby in finely-divided or volatilized form which consists in passing the same through a series of relatively thin films of a solvent solution exposed to the action of air under a pressure above that of the atmosphere, substantially as described.

10. The process of recovering gases or material carried thereby in finely-divided or volatilized form, which consists in dissolving the same in a solution of a double cyanid of potassium and bromin by passing the said substances through thin films of said solution while it is exposed to the direct action of air and gas under pressure, the gases or material carried thereby being thus secured in form for further use or recovery, substantially as described.

11. The process of recovering gases or material carried thereby in finely-divided or volatilized form which consists in first passing said gases, &c., through a series of thin films of a solvent solution and in then removing the aqueous and other vapor still carried by the gas, substantially as described.

12. The process of recovering gases or material carried thereby in a volatilized or finely-divided form, which consists in exposing the same under pressure to a body of solvent solution and then passing them, mixed with air under pressure greater than that of the atmosphere, through a series of thin films of said solution, substantially as described.

13. The process of recovering gases and base or other metallic elements carried thereby in volatilized or finely-divided form, which consists in exposing the same under pressure to a body of a double cyanid of potassium and bromin and dissolving them in said solution by passing them through a series of thin films thereof while mixed with air under pressure greater than that of the atmosphere, and precipitating by an alkaline compound solution containing ammonium hydrate, the base metallic compounds formed in said solution, whereby the gases and substances carried thereby are secured in form for further use or recovery, substantially as described.

In testimony whereof I have signed my name to this specification in the presence of two subscribing witnesses.

SIDNEY T. MUFFLY.

Witnesses:
WALTER CHISM,
JOS. H. KLEIN.